(12) United States Patent
Negishi et al.

(10) Patent No.: US 7,697,411 B2
(45) Date of Patent: Apr. 13, 2010

(54) OFDM BROADCAST SYSTEM FOR TRANSPORTING STREAMS OF DATA

(75) Inventors: Shinji Negishi, Kanagawa (JP); Tamotsu Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 1313 days.

(21) Appl. No.: 10/111,527

(22) PCT Filed: Aug. 27, 2001

(86) PCT No.: PCT/JP01/07317

§ 371 (c)(1),
(2), (4) Date: Aug. 12, 2002

(87) PCT Pub. No.: WO02/17524

PCT Pub. Date: Feb. 28, 2002

(65) Prior Publication Data

US 2003/0103446 A1  Jun. 5, 2003

(30) Foreign Application Priority Data

Aug. 25, 2000 (JP) .............................. 2000-254866

(51) Int. Cl.
*H04J 11/00* (2006.01)
(52) U.S. Cl. .................. 370/208; 370/210; 370/478
(58) Field of Classification Search .............. 370/208, 370/210, 203
See application file for complete search history.

(56) References Cited

U.S. PATENT DOCUMENTS

| | | | | |
|---|---|---|---|---|
| 5,946,326 A | * | 8/1999 | Rinne | 725/54 |
| 6,040,867 A | * | 3/2000 | Bando et al. | 375/240.27 |
| 6,366,309 B1 | * | 4/2002 | Siegle | 348/21 |
| 6,985,432 B1 | * | 1/2006 | Hadad | 370/203 |

FOREIGN PATENT DOCUMENTS

| | | |
|---|---|---|
| EP | 0 928 084 | 7/1999 |
| JP | 11-284688 | 10/1999 |
| JP | 2000-13296 | 1/2000 |
| JP | 2000-59746 | 2/2000 |
| JP | 2000-115119 | 4/2000 |
| JP | 2000-261403 | 9/2000 |
| JP | 2001-298437 | 10/2001 |
| JP | 2001-298438 | 10/2001 |
| WO | WO 00/52861 | 9/2000 |

OTHER PUBLICATIONS

"Narrow Band ISDB-T for Digital Terrestrial Sound Broadcasting: Specification of Channel, Coding, Framing Structure and Modulation", Nov. 29, 1999, ARIB.*

* cited by examiner

*Primary Examiner*—Dang T Ton
*Assistant Examiner*—Brian O'Connor
(74) *Attorney, Agent, or Firm*—Finnegan, Henderson, Farabow, Garrent & Dunner LLP

(57) ABSTRACT

According to the present invention, when a terrestrial digital broadcasting is carried out by applying an OFDM modulation to transport streams MPEG-2 Systems, the plural transport streams subject to a connected transmission are divided into groups and these transport streams are coordinated. Then, a broadcasting station generates a connected transmission descriptor for coordinating the plural transport streams steams subject to the connected transmission and describes the generated connected transmission descriptor in an NIT to multiplex the transport streams.

20 Claims, 11 Drawing Sheets

| NID | TS_id | FREQUENCY | MODE | GUARD INTERVAL | AREA CODE |
|---|---|---|---|---|---|
| NID0 | TS0 | ○○○MHz | 01 | 10 | 010110100101 |
| NID0 | TS1 | ×××MHz | 10 | 11 | 101010010011 |
| NID1 | TS2 | △△△MHz | 00 | 01 | 011001110100 |
| ⋮ | ⋮ | ⋮ | ⋮ | ⋮ | ⋮ |

| DATA STRUCTURE | NUMBER OF BITS | BIT-STRING NOTATION |
|---|---|---|
| connected_transmission_descriptor(){ | | |
|     descriptor_tag | 8 | uimsbf |
|     descriptor_length | 8 | uimsbf |
|     connected_transmission_group_id | 16 | uimsbf |
|     segment_type | 2 | bslbf |
|     modulation_type_A | 2 | bslbf |
|     modulation_type_B | 2 | bslbf |
|     reserved_future_use | 2 | bslbf |
|     for(i=0;i<N;i++){ | | |
|         additional_connected_transmission_info | 8 | uimsbf |
|     } | | |
| } | | |

FIG.5

| SEGMENT FORM TYPE | DESCRIPTION |
|---|---|
| 00 | 1 SEGMENT |
| 01 | 3 SEGMENTS |
| 10 | RESERVE FOR FUTURE USE |
| 11 | REFER TO TMCC SIGNAL |

FIG.6

| MODULATION SYSTEM TYPE | DESCRIPTION |
|---|---|
| 00 | DIFFERENTIAL MODULATION |
| 01 | SYNCHRONOUS MODULATION |
| 10 | RESERVE FOR FUTURE USE |
| 11 | REFER TO TMCC SIGNAL |

FIG.7

| DATA STRUCTURE | NUMBER OF BITS | BIT-STRING NOTATION |
|---|---|---|
| network_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     network_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     network_descriptors_length | 12 | uimsbf |
|     for(i=0;i<N;i++){ | | |
|         descriptor() | | |
|     } | | |
|     reserved_future_use | 4 | bslbf |
|     transport_stream_loop_length | 12 | uimsbf |
|     for(i=0;i<N;i++){ | | |
|         transport_stream_id | 16 | uimsbf |
|         original_network_id | 16 | uimsbf |
|         reserved_future_use | 4 | bslbf |
|         transport_descriptors_length | 12 | uimsbf |
|         for(j=0;j<N;j++){ | | |
|             descriptor() | | |
|         } | | |
|     } | | |
|     CRC_32 | 32 | rpchof |
| } | | |

FIG.8

| DATA STRUCTURE | NUMBER OF BITS | BIT-STRING NOTATION |
|---|---|---|
| connected_transmission_descriptor_2(){ | | |
|     descriptor_tag | 8 | uimsbf |
|     descriptor_length | 8 | uimsbf |
|     for(i=0;i<N;i++){ | | |
|         original_network_id | 16 | uimsbf |
|         transport_stream_id | 16 | uimsbf |
|     } | | |
| } | | |

FIG.9

| DATA STRUCTURE | NUMBER OF BITS | BIT-STRING NOTATION |
|---|---|---|
| terrestrial_delivery_system_descriptor_2(){ | | |
|     descriptor_tag | 8 | uimsbf |
|     descriptor_length | 8 | uimsbf |
|     area_code | 16 | bslbf |
|     guard_interval | 2 | bslbf |
|     transmission_mode | 2 | bslbf |
|     segment_type | 1 | bslbf |
|     modulation_type_A | 1 | bslbf |
|     modulation_type_B | 1 | bslbf |
|     modulation_type_C | 1 | bslbf |
|     descriptor_length | 8 | uimsbf |
|     for(i=0;i<N;i++){ | | |
|         frequency | 8 | uimsbf |
|     } | | |
| } | | |

FIG.10

| NID | TS_id | FREQUENCY | MODE | GUARD INTERVAL | AREA CODE |
|---|---|---|---|---|---|
| NID0 | TS0 | ○○○MHz | 01 | 10 | 010110100101 |
| NID0 | TS1 | ×××MHz | 10 | 11 | 101010010011 |
| NID1 | TS2 | △△△MHz | 00 | 01 | 011001110100 |
| ⋮ | ⋮ | ⋮ | ⋮ | ⋮ | ⋮ |

FIG.14

| SERVICE ID | SERVICE TYPE | TS_id | NID |
|---|---|---|---|
| SERVICE 0 | TELEVISION BROADCASTING | TS0 | NID0 |
| SERVICE 1 | AUDIO BROADCASTING | TS0 | NID0 |
| SERVICE 2 | AUDIO BROADCASTING | TS1 | NID0 |
| SERVICE 3 | AUDIO BROADCASTING | TS2 | NID1 |
| ⋮ | ⋮ | ⋮ | ⋮ |

FIG.15

| SERVICE ID | TS_id | NID0 | CONNECTED TRANSMISSION GROUP ID |
|---|---|---|---|
| SERVICE 31 | TS31 | NID31 | ID31 |
| SERVICE 35 | TS35 | NID31 | ID31 |
| SERVICE 39 | TS39 | NID32 | ID39 |
| ⋮ | ⋮ | ⋮ | ⋮ |

FIG.16

OFDM BROADCAST SYSTEM FOR TRANSPORTING STREAMS OF DATA

TECHNICAL FIELD

The present invention relates to a digital broadcasting system in which OFDM signals obtained by modulating transport streams prescribed in MPEG-2 Systems in accordance with an orthogonal frequency division multiplexing (OFDM) system are broadcast through a broadcasting network composed of a plurality of transmission channels.

BACKGROUND ART

In Japan, a broadcasting standard called an ISDB-Tn (Integrated Services Digital Broadcasting-Terrestrial narrow) or an ISDB-T$_{SW}$ using an OFDM (Orthogonal Frequency Division Multiplexing) modulation has been proposed as a terrestrial digital audio broadcasting system. Also, in Japan, the "service information for digital broadcasting system, ARIB STD-B10" has been proposed by the association of radio industries and business (ARIB) as the application standard of the configuration of service information, kinds of signals and the data structure and the identifier thereof used for digital broadcasting. There is published a 1.3 edition of the "service information for digital broadcasting system, ARIB STD-B10" as of June, 2000. This "service information for digital broadcasting system, ARIB STD-B10" will be referred to as ARIB STD-B10, hereinafter. According to the ARIB STD-B10, the service information is specified so as to be transmitted by using the data structure of a section type prescribed in the MPEG-2 Systems (ITU-T H.222.0 ISO/IEC13818-1). In the terrestrial digital audio broadcasting in Japan, the configuration of the service information of a broadcasting program is determined in accordance with the ARIB STD-B10. There is published a 3.1 edition of the ARIB STD-B10 which is a revised edition of the 1.3 edition as of Aug. 25, 2000.

When the digital broadcasting of the OFDM system is carried out, prescribed amount of frequency intervals are generally provided between respective channels in order to prevent a radio interference with the adjacent frequency channels to provide guard bands. As compared therewith, the applicant of the present invention proposed a connected transmission method in which adjacent frequency channels are connected in the direction of frequency and an OFDM modulation is performed to the connected frequency channels in the International Patent Application (International Patent Publication No. WO00/52861). In the connected transmission method, the center frequencies of OFDM signals in the frequency areas of a plurality of transmission channels are respectively changed and the OFDM signals are multiplexed in the directions of frequencies and the OFDM signals in the frequency areas of the plural transmission channels are simultaneously subject to an IFFT (Inverse Fast Fourier Transform) process. Under the above-described process, the OFDM signals to be transmitted to the plural transmission channels can be multiplexed in the frequency directions, while an orthogonality thereof is maintained.

In the connected transmission method for the OFDM signals, while guard bands between the respective channels are removed, the OFDM signals can be transmitted by connecting the plural transmission channels in the directions of frequency axes and a broadcasting with a frequency availability improved can be performed.

This connected transmission method is currently applied to the ISDB-Tn.

When such a connected transmission is carried out, not only the frequency availability is improved, but also, for instance, a receiving side also has advantageous effects as mentioned below.

For example, when a transmission channel for receiving an OFDM signal is switched to another transmission channel, a receiver cancels a synchronizing channel before switching and tunes in the frequency of a transmission channel after switching. Then, the receiver detects the synchronous code of a transmission control signal (In the ISDB-Tn system, TMCC (Transmission and Multiplexing Configuration Control) corresponds to a transmission control signal) from the transmission channel after switching and carries out the synchronization pull-in operation of an OFDM segment (the frame of transmission data of the OFDM signal). When this synchronization pull-in operation of the OFDM segment is achieved, the receiver can demodulate the signal of the switched transmission channel.

As compared therewith, when the connected transmission is carried out, a transmission signal can be generated while the OFDM segments between channels are synchronized. When the transmission signal is generated while the OFDM segments are synchronized as described above, a receiver can continuously use a synchronizing timing established in a transmission channel before switching also in a transmission channel after switching, even when a channel is switched to another channel between the transmission channels in which the connected transmission is carried out. Therefore, the receiver can simplify the synchronization pull-in operation for demodulation of a signal and perform a channel switch at high speed.

Further, the applicant of the present invention proposed a high speed channel switching upon connected transmission in Japanese Patent Application Nos. 2000-117226 and 2000-117227.

When the modulation system of a transmission channel is a synchronous modulation system, the receiver estimates the transmission characteristics of a transmission line by using SP (Scattered Pilot) signals inserted into the OFDM segments to perform a waveform equalizing process. The SP signal is determined on the basis of the standard of the ISDB-Tn. Since the SP signals are discretely inserted relative to the frequency direction, the receiver interpolates these SP signals in the frequency direction so that the receiver can estimate transmission characteristics to OFDM symbols in all sub-carrier positions in the transmission channel. However, the OFDM symbol located at the end of the frequency direction in the transmission channel has the number of the SP signals referred to for estimation decreased more than that of the OFDM symbol located in the central position of the transmission channel. Therefore, the estimation feature of the transmission characteristics of the OFDM symbol at the end part in the frequency direction in the transmission channel has been deteriorated.

On the other hand, when an upper adjacent channel (a transmission channel adjacent to a high frequency side) of the connected transmission type synchronous modulation system or a lower adjacent transmission channel (a transmission channel adjacent to a low frequency side) of a synchronous modulation system exists in a transmission channel which is receiving a signal, the transmission characteristics can be estimated by using SP signals included in the upper and lower adjacent transmission channels. Accordingly, the OFDM symbol located at the end part in the frequency direction in the transmission channel can also obtain interpolation characteristics similar to those of the OFDM symbol in the central part in the frequency direction of the transmission channel and the transmission line characteristics can be more accurately estimated.

As described above, when the connected transmission is carried out, the receiver side can perform a channel switching at high speed or can improve the estimation characteristics of the transmission line characteristics.

However, it has been hitherto impossible for the receiver side to know information as to whether or not the connected transmission is performed between the transmission channel which is receiving a signal and other transmission channel, and information as to whether the upper adjacent channel is present or the lower adjacent transmission channel is present, and further, information as to whether these channels are of the synchronous modulation system or a differential modulation system.

DISCLOSURE OF THE INVENTION

It is an object of the present invention to provide a digital broadcasting system, a digital broadcasting transmitter, a digital broadcasting receiver and a digital broadcasting method in which a signal obtained by modulating a transport stream specified by MPEG-2 Systems in accordance with an orthogonal frequency division multiplexing (OFDM) system is applied as a broadcasting signal and a receiver side can know a transmission channel subject to a connected transmission.

The digital broadcasting system in which OFDM signals obtained by modulating transport streams specified in MPEG-2 Systems in accordance with an orthogonal frequency division multiplexing (OFDM) system are broadcast through a broadcasting network having a plurality of transmission channels; wherein a connected transmission that the OFDM signals transmitted to the plural channels are multiplexed in the frequency direction while the orthogonality thereof is maintained is carried out and a connected transmission descriptor for coordinating the plural transport streams subject to the connected transmission is included in control information specified in the MPEG-2 Systems and transmitted.

The digital broadcasting transmitter in which OFDM signals obtained by modulating transport streams specified in MPEG-2 Systems in accordance with an orthogonal frequency division multiplexing (OFDM) system are broadcast through a broadcasting network having a plurality of transmission channels; wherein a connected transmission that the OFDM signals transmitted to the plural channels are multiplexed in the frequency direction while the orthogonality thereof is maintained can be carried out in the broadcasting network and a connected transmission descriptor for coordinating the plural transport streams subject to the connected transmission is included in control information specified in the MPEG-2 Systems and transmitted.

The digital broadcasting receiver in which OFDM signals obtained by modulating transport streams specified in MPEG-2 Systems in accordance with an orthogonal frequency division multiplexing (OFDM) system are broadcast through a broadcasting network having a plurality of transmission channels; wherein when the transport streams are received in which a connected transmission that the OFDM signals transmitted to the plural channels are multiplexed in the frequency direction while the orthogonality thereof is maintained is carried out, a connected transmission descriptor for coordinating the plural transport streams subject to the connected transmission is extracted from control information specified in the MPEG-2 Systems, and a receiving control is carried out on the basis of information described in the extracted descriptor.

The digital broadcasting method in which OFDM signals obtained by modulating transport streams specified in MPEG-2 Systems in accordance with an orthogonal frequency division multiplexing (OFDM) system are broadcast through a broadcasting network having a plurality of transmission channels; wherein a connected transmission that the OFDM signals transmitted to the plural channels are multiplexed in the frequency direction while the orthogonality thereof is maintained can be carried out in the broadcasting network and a connected transmission descriptor for coordinating the plural transport streams subject to the connected transmission is included in control information specified in the MPEG-2 Systems and transmitted.

BRIEF DESCRIPTION OF THE DRAWINGS

FIG. 5 is a diagram for explaining the data structure of a connected transmission descriptor.

FIG. 6 is a diagram for explaining the types and kinds of segments in the above described connected transmission descriptor.

FIG. 7 is a diagram for explaining types of modulation systems in the connected transmission descriptor.

FIG. 8 is a diagram for explaining the data structure of an NIT.

FIG. 9 is a diagram for explaining the data structure of a second connected transmission descriptor.

FIG. 10 is a diagram for explaining the data structure of an extended terrestrial delivery system descriptor.

FIG. 14 is a diagram for explaining a terrestrial delivery system list.

FIG. 15 is a diagram for explaining a service list.

FIG. 16 is a diagram for explaining a connected transmission list.

BEST MODE FOR CARRYING OUT THE INVENTION

Figure 1:
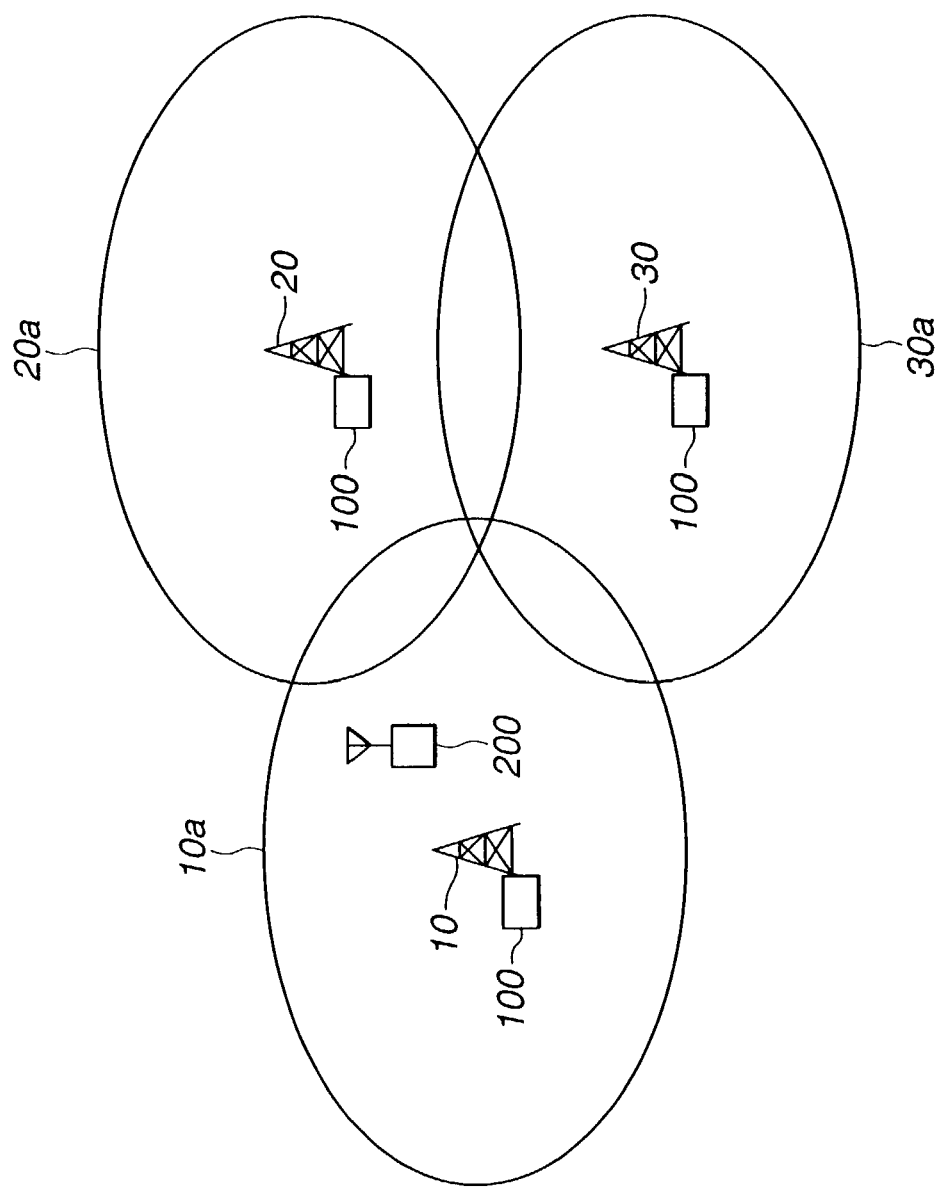
FIG. 1 is a diagram for explaining a digital broadcasting system according to an embodiment of the present invention.

Now, an example that the present invention is applied to a terrestrial digital broadcasting system of an ISDB-Tn (Integrated Services Digital Broadcasting-Terrestrial narrow) system will be described. The ISDB-Tn is a terrestrial digital audio broadcasting standard employed in Japan.

A terrestrial digital broadcasting system 1 according to an embodiment of the present invention is a system that terrestrial broadcasting transmitted by a digital system respectively from a plurality of broadcasting stations 10, 20 and 30 are received by a receiver 200.

The broadcasting stations 10, 20 and 30 are respectively provided with transmitters 100. Each transmitter 100 transmits the broadcast wave through an antenna. The ranges of the broadcast waves transmitted from the broadcasting stations 10, 20 and 30 are limited. In the terrestrial digital broadcasting system 1, ranges where the broadcast waves can be received are shown as service areas 10a, 20a and 30a.

In the ISDB-Tn, an OFDM (Orthogonal Frequency Division Multiplexing) modulation system is employed for a modulation system. Further, in the ISDB-Tn, MPEG-2 Systems (ITU-T H.222.0, ISO/IEC 13818-1) are used as digital information series to be transmitted. In addition, in the ISDB-Tn, one transport stream is transmitted to one transmission channel.

Still further, in the ISDB-Tn, there are provided groups each composed of a data unit called a data segment including a plurality of transport packets (TSP) prescribed in the MPEG-2 Systems. Further, pilot signals (SP [Scattered Pilot], CP [Continual Pilot], TMCC [transmission and Multiplexing Configuration Control], AC [Auxiliary Channel]) are added to the data segment to form a transmission frame called an OFDM segment and perform an OFDM modulation.

Figure 2:
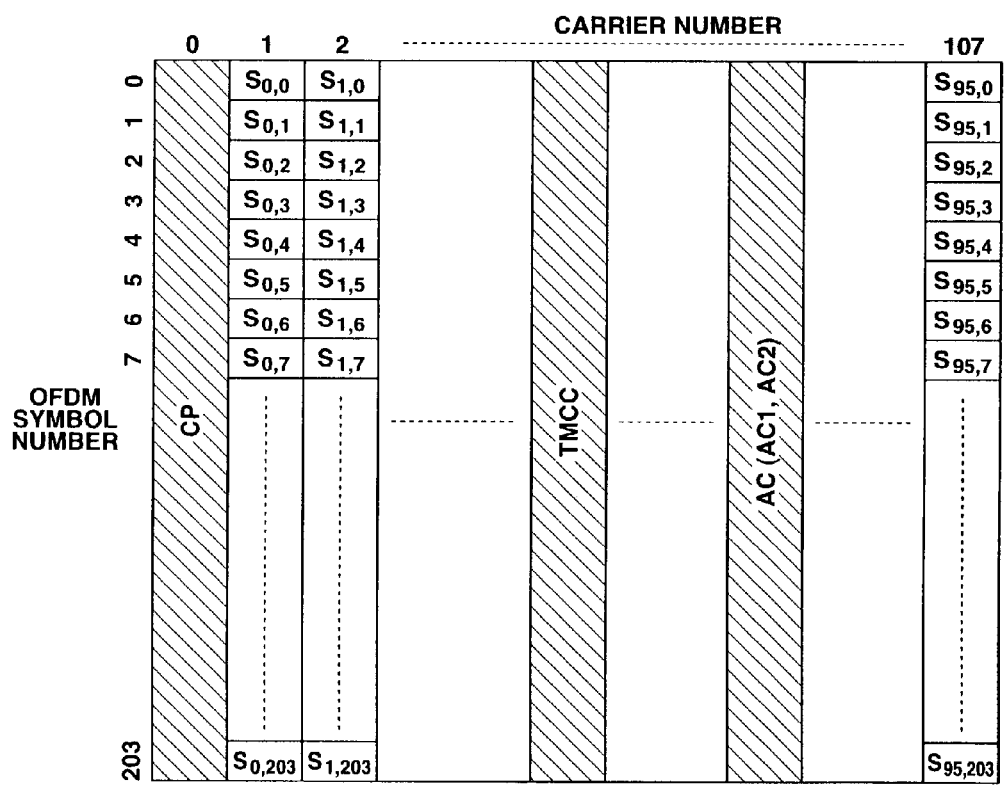
FIG. 2 is a diagram for explaining the data configuration (in the case of a differential modulation) of an OFDM segment prescribed in an ISDB-Tn.
Figure 3:
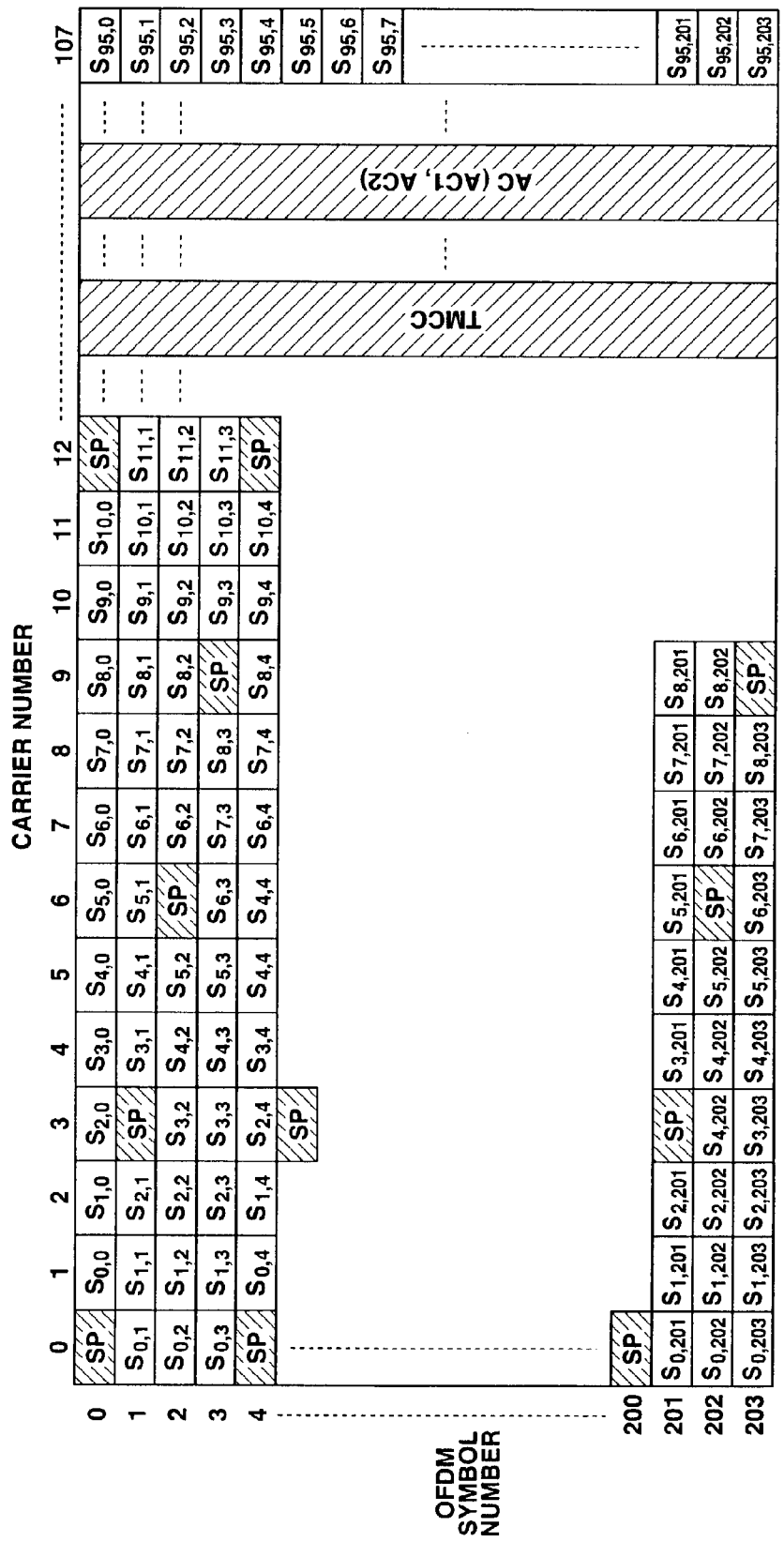
FIG. 3 is a diagram for explaining the data configuration (in the case of a synchronous modulation) of the OFDM segment prescribed in the ISDB-Tn.
Figure 4:
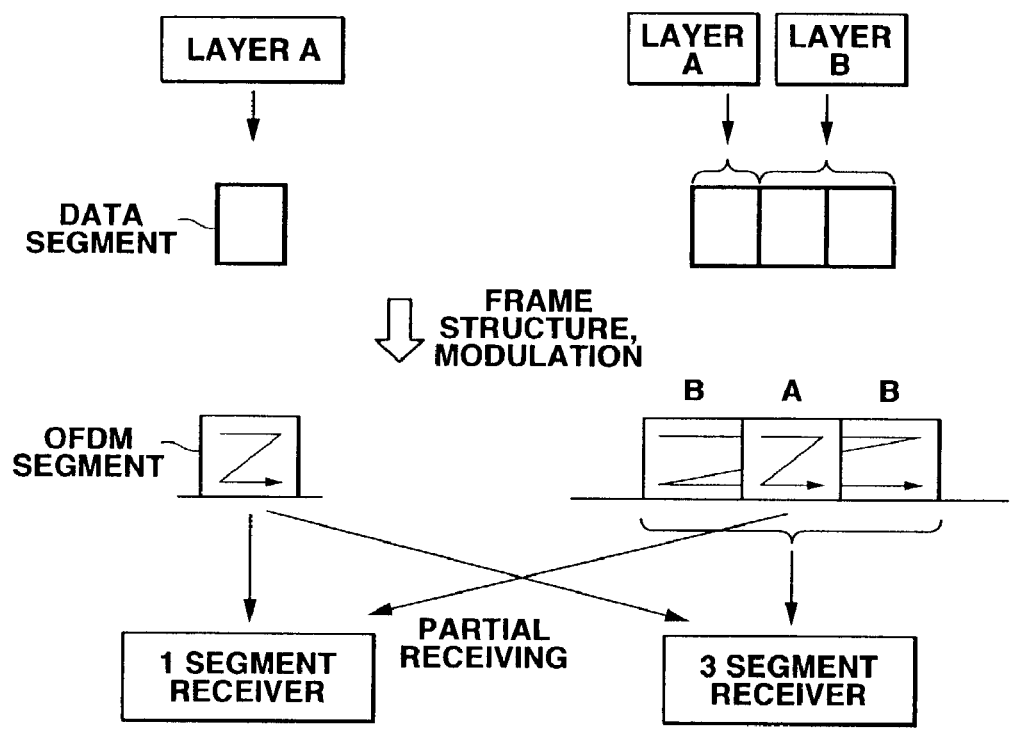
FIG. 4 is a diagram for explaining a segment structure prescribed in the ISDB-Tn.

The data configuration (in the case of a mode 1 in the ISDB-Tn standard) of the OFDM segment is shown in FIGS. 2 and 3. In FIGS. 2 and 3, an axis of abscissas shows a direction of frequency and an axis of ordinates shows a direction of time. FIG. 2 shows the configuration of the OFDM segment when an information signal is modulated by a differential modulation (DQPSK). FIG. 3 shows the configuration of the OFDM segment when an information signal is modulated by a synchronous modulation (QPSK, 16QAM, 64QAM).

As shown in FIGS. 2 and 3, in the ISDB-Tn (mode 1), 204 OFDM symbols (symbol Nos. #0 to #203) are arranged in the direction of time. The OFDM symbol is a unit for performing a simultaneous FFT. The 1 OFDM symbol is composed of 108 data. The data forming each OFDM symbol is modulated to 108 pieces of sub-carriers (carrier Nos. #0 to #107) respectively assigned to bands.

The OFDM segment of the differential modulation system comprises various kinds of control signals having information signals ($S_{0,0}$ to $S_{95,203}$) orthogonally modulated in accordance with the DQPSK, CP (Continual Pilot) signals, TMCC (Transmission and Multiplexing Configuration Control) signals and AC (Auxiliary Channel) signals. On the other hand, the OFDM segment of the synchronous modulation system comprises control signals having information signals ($S_{0,0}$ to $S_{95,203}$) orthogonally modulated in accordance with the QPSK, 16QAM, 64QAM, CP signals, TMCC signals, AC signals and SP (Scattered Pilot) signals.

The CP signal is a signal having completely fixed phase and amplitude. When the information signal is modulated in accordance with the differential modulation system, the CP signal is arranged in the first carrier of each OFDM symbol (a position of the lowest frequency).

The SP signal is a signal modulated on the basis of BPSK modulation. The SP signals are arranged at intervals of 12 carriers in the direction of frequency and at intervals of 4 symbols in the direction of symbols. Since the SP signals are utilized to estimate propagation line characteristics when a receiving side equalizes a waveform, the SP signals are inserted into the OFDM segment only in the case of a synchronous modulation (QPSK, 16QAM, 64QAM) which requires a waveform equalization.

The TMCC signals and the AC signals are signals modulated on the basis of BPSK modulation and arranged in prescribed positions in the segment. The AC signal is employed for transmitting additional information. The TMCC signal is transmission control information composed of 204 bits ($B_0$ to $B_{203}$) which concludes for each OFDM segment unit. In the TMCC signal, a synchronous code, a modulation system, a convolutional coding rate, an interleave length and the like are included as the transmission control information.

In the ISDB-Tn, one or three of the above-described OFDM segments are combined together in the frequency direction to form one transmission channel and transmit a transport stream. In the ISDB-Tn, a transmission form that three OFDM segments are arranged in the frequency direction to form a transmission channel is called a three segment form. A transmission form that one OFDM segment is arranged in the frequency direction to from one transmission channel is called a one segment form.

In the three segment form, one OFDM segment (layer A) at the central part in the frequency direction and two OFDM segments (layers B) adjacent to the central segment in the upper and lower parts in the frequency direction form a transmission channel. Thus, a two-layered transmission that the transmission property of the layer A is different from that of the layer B can be carried out. More specifically, in the three segment form, parameters such as a modulation system, the coding rate of an inner code and a time interleave length in the layer A may be different from those in the layer B. Further, in the three segment form, a frequency interleave is completed in each layer. Therefore, the OFDM segment of the Layer A in the three segment form can be partly received even by a receiver with its function restricted which can receive only a transmission signal of one segment form.

The OFDM segment is prescribed so as to be interactively applied to ISDB-Tw (Integrated Services Digital Broadcasting-Terrestrial wide) as a terrestrial digital television broadcasting system. In the ISDB-Tw, 13 OFDM segments form one channel composed of a three-layered configuration having layers A, B and C.

According to the ISDB-Tn in Japan, a frequency band such as a band of 188 MHz to 194 MHz or a band of 192 to 198 MHz (bandwidth of 6 MHz) is assigned as an available frequency band. In the ISDB-Tn, the bandwidth of 6 MHz is divided into 13 segments. In the ISDB-Tn, the above-described OFDM segments are assigned to the 13 segments to perform a transmission.

Further, in the ISDB-Tn, when a plurality of transmission channels are subject to a connected transmission system, the connected transmission is carried out between the transmission channels in the 13 segments in this 6 MHz band. According to the ISDB-Tn, an arbitrary number of combinations among the number of combinations of the segments located within a range of 2 to 13 can be connected together. Additionally, the transmission channel of the one segment form can be connected to the transmission channel of the three segment form.

In the ISDB-Tn, PSI/SI (Program Specific Information/Service Information) which is auxiliary information for selecting programs or obtaining the information of programs is included in a transport stream and the transport stream including the PSI/SI is transmitted. The PSI/SI utilized in the ISDB-Tn is defined in the MPEG-2 Systems and the ARIB STD-B10.

In the MPEG-2 Systems and the ARIB STD-B10, an NIT (Network Information Table) is prescribed as one of the PSI/SI information. The NIT shows information concerning the physical configuration of the transport stream supplied by a network and the features of the network itself. In the ARIB STD-B10, there is provided a definition as described below. That is, a terrestrial delivery system descriptor [terrestrial_delivery_system_descriptor( )] indicating physical conditions concerning a broadcast signal itself such as frequency information or transmission parameters related to the transport stream which belongs to the network or a service list descriptor Service Description Table [service_list_descriptor( )] is included in a transport stream loop in the NIT and the transport stream loop including them is transmitted.

Now, the inventors of the invention decides that a connected transmission descriptor [connected_transmission_descriptor( )] in which the physical conditions of the transport stream belonging to the network upon connected transmission are described is newly defined as a descriptor to be included in the NIT (Network Information Table).

Now, the connected transmission descriptor [connected_transmission_descriptor( )] will be described below.

FIG. 5 shows the data structure of the connected transmission descriptor [connected_transmission_descriptor( )].

The connected transmission descriptor [connected_transmission_descriptor( )] is a descriptor which can identify the groups of the transport streams subject to the connected transmission to enumerate the transport streams in the groups. The connected transmission descriptor [connected_transmission_descriptor( )] is described in the TS loop of the NIT.

In a [descriptor_tag], a tag for discriminating the descriptor from other identifiers is described.

In a [descriptor_length], the number of all bytes continuing below is described.

In a [connected_transmission_group_id], a connected transmission group ID for identifying the group of the transport stream subject to the connected transmission is described.

In a [segment_type], is described a segment form type for identifying whether the transport stream designated by the connected transmission descriptor has the one segment form or the three segment form. The [segment_type] is information of 2 bits. As shown in FIG. 6, "00" designates the one segment form, "01" designates the three segment form and "11" indicates a decision by referring to a TMCC signal. "10" designates a reserve for future.

In a [modulation_type_A], is described a modulation system type indicating a synchronous modulation system or a differential modulation system. The [modulation_type_A] indicates the modulation system type of the data of a whole segment in the case of the one segment form, and the modulation system type of the layer A in the case of the three segment form. The [modulation_type_A] represents information of two bits. As shown in FIG. 7, "00" represents the differential modulation system (DQPSK), "01" represents the synchronous modulation system (QPSK, 16QAM, 64QAM) and "11" represents a decision by referring to a TMCC signal. "10" designates a reserve for future.

In a [modulation_type_B], is described a modulation system type for indicating whether the modulation system of the layer B in the three segment form is the synchronous modulation system or the differential modulation system. The [modulation_type_B] is meaningless in the case of the one segment form. The [modulation_type_B] is information of 2 bits. Like the [modulation_type_A], "00" designates the differential modulation system (DQPSK), "01" designates the synchronous modulation system (QPSK, 16QAM. 64QAM) and "11" designates a decision by referring to a TMCC signal. "10" designates a reserve for future.

In a [additional_connected_transmission_info], is described supplemental information specified by the application regulations of an enterprise.

The data structure of the NIT in which the above-described connected transmission descriptor [connected_transmission_descriptor( )] is described is shown in FIG. 8.

The NIT (Network Information Table) is a table for indicating information concerning the physical configuration of the transport stream supplied by the network and the features of the network itself. In the NIT, an NIT showing the information of its own network and an NIT showing the information of other network are included.

[table_id] designates an identifier showing what is indicated by a network information section. In the case of the NIT of its own network, a value of "0x40" is described. In the case of the NIT of other network, a value of "0x41" is described.

[section_syntax_indicator] designates an identifier indicating a section syntax instruction and its value is always set to "1".

[reserved_future_use] designates a reserve extended area in which any information for future use can be prescribed.

[reserved] designates a reserve area.

[section_length] prescribes the number of bytes from a part immediately after a section length field to the last part of a section including CRC (Cyclic Redundancy Check).

[network_id] indicates an ID for identifying a network designated by NIT.

[version_number] designates the version number of a sub-table.

[current_next_indicator] designates an identifier for indicating that the sub-table is a present sub-table when the value thereof is "1", and that a supplied sub-table is not applied yet and a next sub-table is used, when the value is "0".

[section_number] designates the number of a section. When the section is a first section in the sub-table, a value of "0x00" is shown. The section number is increased by "1" for each addition of the section having the same [table_id] and [network_id].

[last_section_number] designates the last section of the sub-table to which a section belongs, that is, the number of the section having the largest section number.

[network_descriptor_length] designates the number of all bytes of a loop of a subsequent network descriptor (descriptor( ). In the loop, the network descriptor is described.

[transport_stream_loop_ength] designates the number of all bytes of a transport stream loop which concludes immediately before the first byte of a CRC.

Then, a TS loop is subsequently described.

[transport_stream_id] in the TS loop designates an ID for discriminating the transport stream from other multiplex in a delivery system.

[original_network_id] designates an ID for indicating [network_id] of an original network.

[transport_descriptor_length] designates an identifier for indicating the number of all bytes of a loop of a subsequent transport descriptor (descriptors). In the transport descriptor, the connected transmission descriptor [connected_transmission_descriptor( )], the terrestrial delivery system descriptor [terrestrial_delivery_system_descriptor( )], and the service list descriptor Service Description Table [service_list_descriptor( ) ] are described.

[CRC_32] designates a CRC and an error code including a CRC value that a register output obtained after a whole section is processed is "0".

As described above, the connected transmission descriptor [connected_transmission_descriptor( )] serves to coordinate a plurality of transmission channels (transport stream) subject to the connected transmission. Therefore, the connected transmission descriptor is included in the control information of the MPEG-2 Systems, so that the plural transport streams subject to the connected transmission are coordinated to inform a receiver of the coordinated transport streams.

Accordingly, the receiver analyzes the connected transmission descriptor included in the NIT so that the receiver can decide whether or not an upper adjacent segment (a segment adjacent to a high frequency side) whose connected transmission is performed is present in a segment in which a currently received transport stream is contained, and whether or not a lower adjacent segment (a segment adjacent to a low frequency side) whose connected transmission is performed is present, and further whether the modulation system of the upper adjacent or lower adjacent segment is a synchronous modulation system or a differential modulation system. Thus, when the modulation system of the segment in which the currently received transport stream is contained is the synchronous modulation system, the receiver can estimate transmission characteristics by using SP signals included in the upper and lower adjacent segments. The SP signals of the adjacent segments are used as described above to estimate the transmission characteristics, so that the transmission characteristics of a sub-carrier in the frequency direction of the segment can be precisely estimated and a waveform can be more accurately equalized.

When the adjacent transmission channel (transport stream) whose connected transmission is performed has the three segment form, a layer B in the adjacent transmission channel serves as an adjacent segment. When the modulation system of the layer B is the synchronous modulation system, transmission characteristics can be estimated by using an SP signal. Further, when the transmission channel which is receiving the transport stream has the three segment form, a segment adjacent to the segment of a layer A is a layer B in its own transmission channel (transport stream). Further, a segment adjacent to the segment of the layer B is the segment of the layer A in its own transmission channel (transport stream) and the segment of other transmission channel (other transport stream).

Further, when the receiver analyzes the connected transmission descriptor included in the NIT to switch a transmission channel for receiving a transport stream to another transmission channel, the receiver can obtain information as to whether or not there exists a relation of the connected transmission between the transmission channel before switching and the transmission channel after switching. When there exists the relation of the connected transmission between the transmission channel before switching and the transmission channel after switching, the receiver can continuously employ a synchronizing timing established in the transmission channel before switching in the transmission channel after switching. Therefore, the receiver can simplify a synchronization pull-in operation for demodulation and decrease channel switching time.

The above-described connected transmission descriptor is defined in the edition 3.1 of the ARIB STD-B10 issued in Jul. 27, 2001.

As the method for coordinating a plurality of transmission channels (transport streams) subject to the connected transmission, although the example that the connected transmission descriptor [connected_transmission_descriptor( )] as shown in FIG. 5 is included in the NIT and transmitted is described, a plurality of transmission channels (transport streams) may be coordinated by a second connected transmission descriptor [connected_transmission_descriptor_2( )] as shown below and a new terrestrial delivery system descriptor [terrestrial_delivery system_descriptor 2( )] obtained by extending the terrestrial delivery system descriptor [terrestrial_delivery_system_descriptor( )] prescribed by the ARIB STD-B10.

FIG. 9 shows the data structure of the second connected transmission descriptor [connected_transmission_descriptor_2( )].

The connected transmission descriptor [connected_transmission_descriptor_2( )] designates a descriptor which can enumerate transport streams subject to the connected transmission together with the transport stream. The connected transmission descriptor [connected_transmission_descriptor_2( )] is described in the TS loop of the NIT of, for instance, a self-network.

[descriptor_tag] designates a tag for discriminating the descriptor from other identifiers.

[descriptor_length] designates the number of all bytes of a subsequent loop (means a loop of [for(i=0; <N; i++) {to}]).

In the loop [for(i=0; <N; i++) {to}], [original_network_id] and [transport_stream_id] are described.

The [original_network_id] designates a network ID of an original network of a transport stream subject to the connected transmission.

The [transport_stream_id] designates an ID for identifying a transport stream subject to the connected transmission.

FIG. 10 shows the data structure of the extended terrestrial delivery system descriptor [terrestrial_delivery_system_descriptor_2( )].

The terrestrial delivery system descriptor [terrestrial_delivery_system_descriptor_2( )] designates a descriptor for indicating the physical conditions of a terrestrial transmission line. The terrestrial delivery system descriptor is described in the TS loop of the NIT.

[descriptor_tag] designates a tag for discriminating the descriptor from other identifiers.

[descriptor_length] indicates the number of all bytes of subsequent data.

Figure 11:
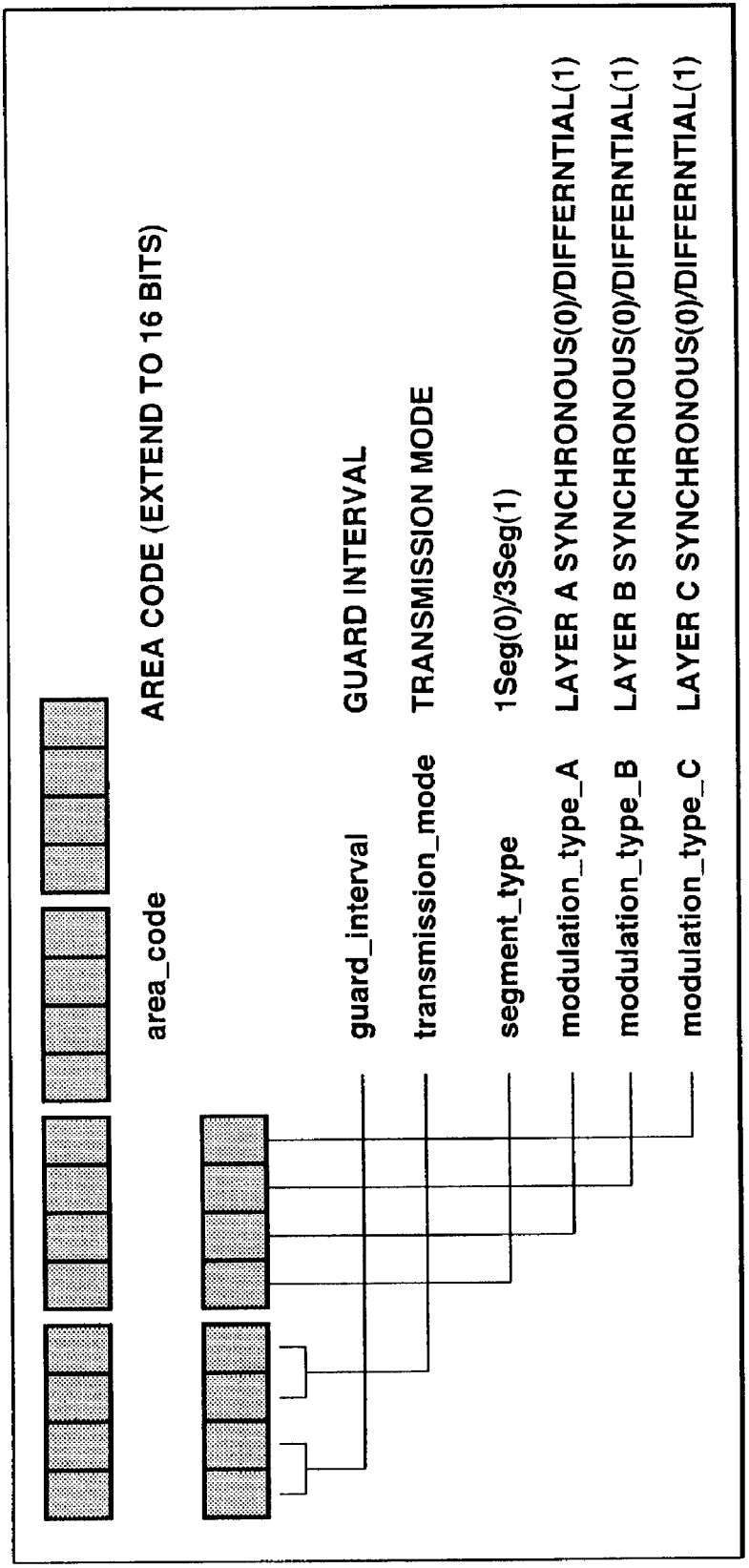
FIG. 11 is a diagram for explaining the contents of data described in the extended terrestrial delivery system descriptor.

[area_code] designates a service area to which the transport stream is transmitted. The [area_code] is extended to 16 bits as shown in FIG. 11.

[guard_interval] designates the guard interval of the transport stream.

[transmission_inode] designates the mode information of the transport stream.

[segment_type] designates information of 1 bit for identifying the one segment form or the three segment form. For example, as shown in FIG. 11, in the case of the one segment form, "0" is described. In the case of the three segment form, "1" is described. This [segment_type] is new information which is not prescribed in the ARIB STD B-10.

[modulation_type_A] designate segment form identifying information of 1 bit indicating whether the segment form of the layer A is the synchronous modulation system or the differential modulation system. For instance, as shown in FIG. 11, when the layer A shows the synchronous modulation system, "O" is described, and when the layer A shows the differential modulation system, "1" is described. The [modulation_type_A] is new information which is not prescribed in the ARIB STD B-10.

[modulation_type B] designate segment form identifying information of 1 bit indicating whether the segment form of the layer B is the synchronous modulation system or the differential modulation system. For instance, as shown in FIG. 11, when the layer B shows the synchronous modulation system, "0" is described, and when the layer B shows the differential modulation system, "1" is described. The [modulation_type_B] is new information which is not prescribed in the ARIB STD B-10.

[modulation_type_C] designate segment form identifying information of 1 bit indicating whether the segment form of the layer C is the synchronous modulation system or the differential modulation system. For instance, as shown in FIG. 11, when the layer C shows the synchronous modulation system, "0" is described, and when the layer C shows the differential modulation system, "1" is described. The [modulation_type_C] is new information which is not prescribed in the ARIB STD B-10.

[frequency] designates an identifier indicating frequency under which the transport stream is transmitted.

The above-described second connected transmission descriptor [connected_transmission_descriptor_2( )] and the extended terrestrial delivery system descriptor [terrestrial_delivery_system_descriptor_2( )] are also described in the TS loop of the NIT, so that a plurality of transport streams subject to the connected transmission can be coordinated together to inform the receiver of the coordinated transport streams.

Now, a transmitter 100 which can perform a connected transmission in a transmitting station 10 will be described.

Figure 12:
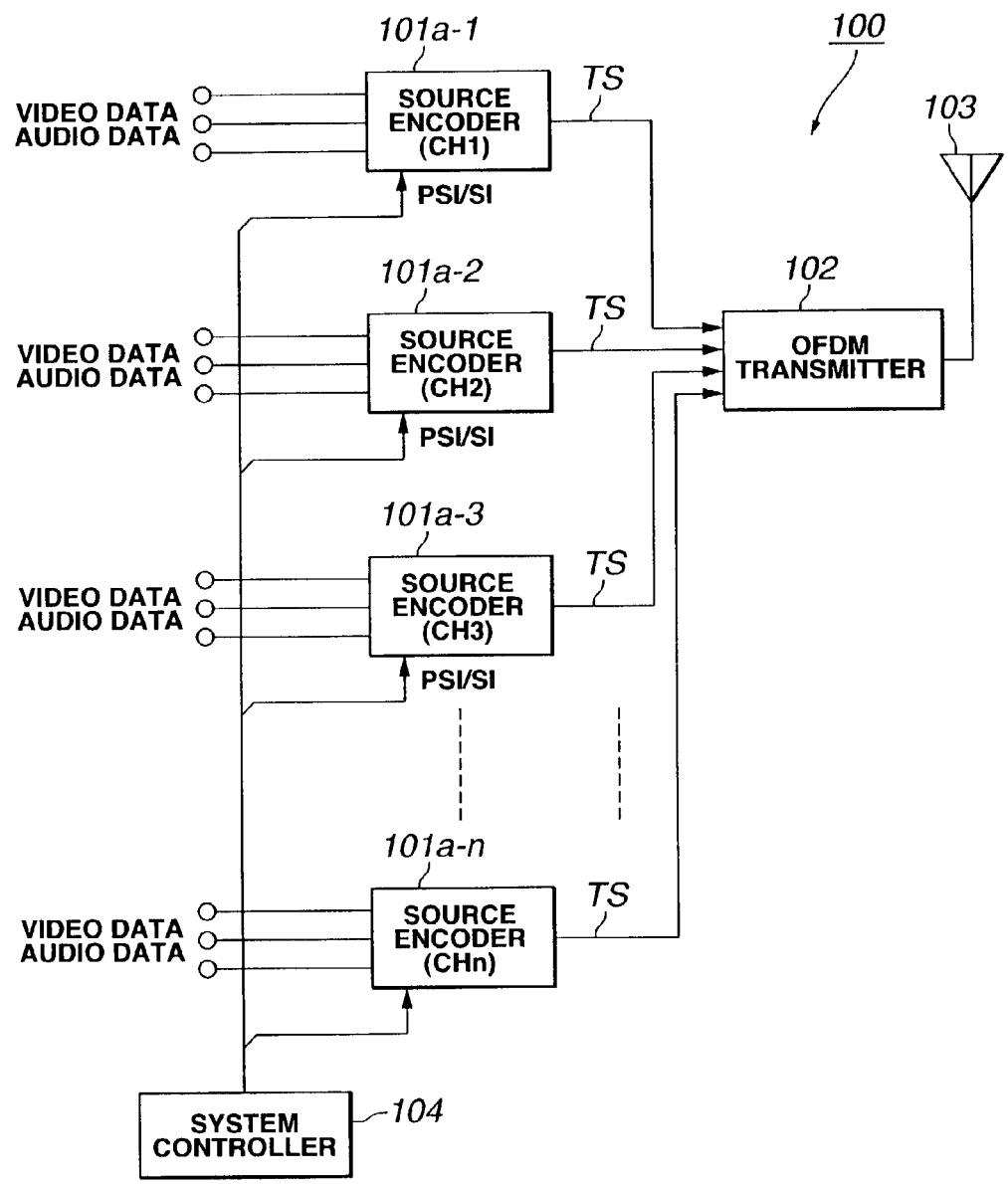
FIG. 12 is a diagram for explaining the construction of a transmitter used in the digital broadcasting system.

As shown in FIG. 12, the transmitter 100 comprises a plurality of source encoders 101a (101a-101 to 101a-n), an OFDM transmitter 102, an antenna 103 and a system controller 104.

To each source encoder 101a, video data or audio data in a baseband is inputted. They are compressed and encoded in accordance with, for instance, the MPEG-2 system to generate program streams. The source encoders 101a respectively multiplex these plural program streams to form transport streams prescribed in the MPEG-2 Systems. Each transport stream outputted from each source encoder 101a corresponds to each transmission channel. Further, to each source encoder 101a, the control information (PSI/SI information) such as the NIT generated in the system controller 104 is inputted. The control information is also included in and multiplexed to the transport streams. In the control information, the above-described connected transmission descriptor [connected_transmission_descriptor( )] is included.

The OFDM transmitter 102 applies a transmission line encoding process to each transport stream inputted from each source encoder 101a, that is, each transmission channel to form an OFDM symbol shown in FIGS. 2 and 3 for each transport stream unit. Subsequently, the OFDM transmitter 102 synchronizes a plurality of OFDM symbols generated respectively for the transmission channels in the time base direction and further multiplexes these OFDM symbols in the frequency direction. Then, the OFDM transmitter 102 applies a simultaneous IFFT conversion to the OFDM symbols multiplexed in the frequency direction and an OFDM modulation to the multiplexed OFDM symbols. The OFDM transmitter 102 carries out the processes as mentioned above so that the OFDM transmitter 102 can connect altogether the plural transmission channels. Then, the transmitted waves of the plural transmission channels connected by the OFDM transmitter 102 are transmitted outside through an antenna 103.

Now, an explanation will be given to a receiver 200 for receiving transmitted terrestrial broadcast waves.

Figure 13:
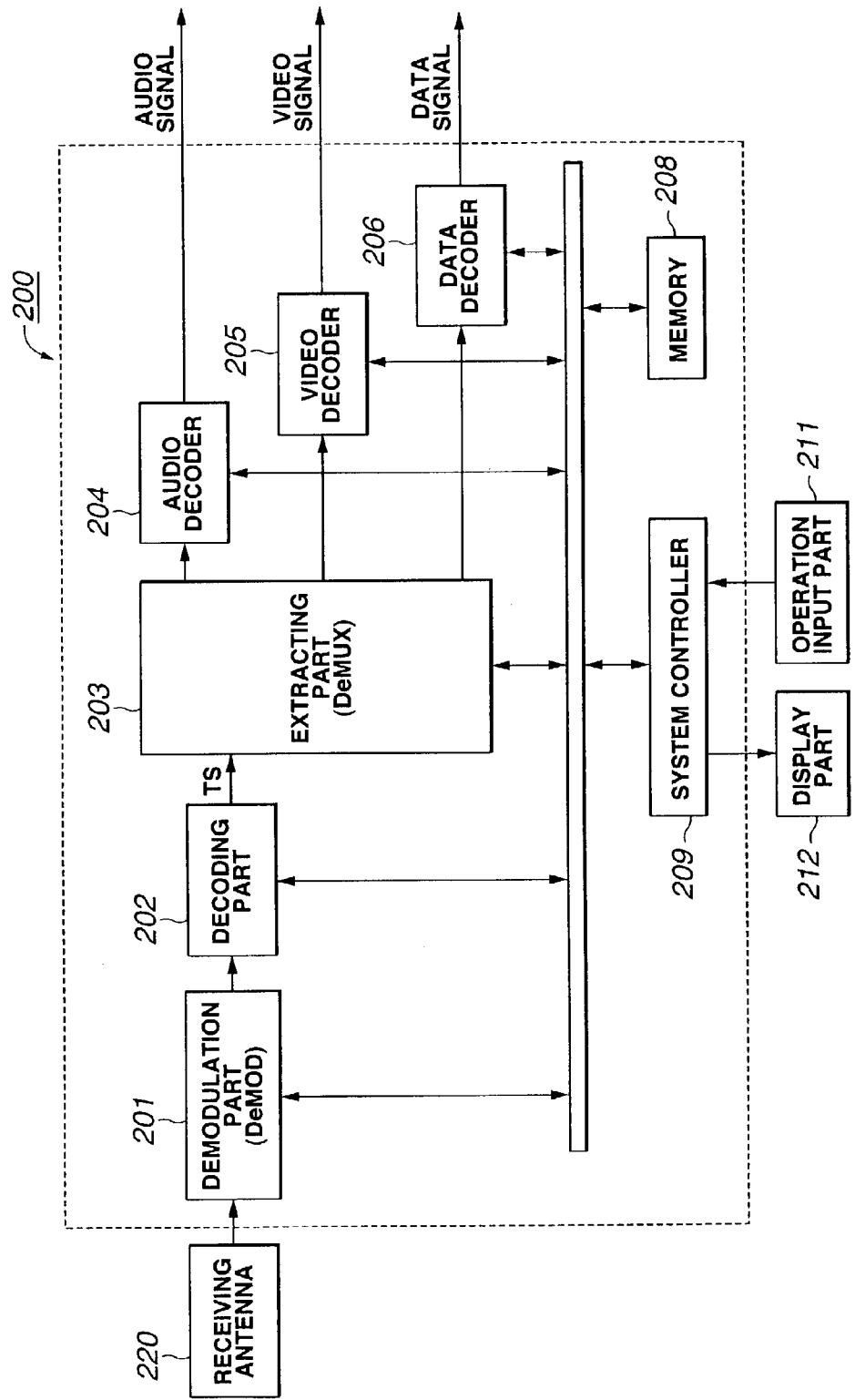
FIG. 13 is a diagram for explaining the construction of a receiver used in the digital broadcasting system.

As shown in FIG. 13, the receiver 200 comprises a demodulation part 201 to which a broadcast signal is inputted from a receiving antenna 220 for receiving the broadcast wave of a terrestrial broadcasting to apply a digital demodulation process to the broadcast signal, a decoding part 202 for applying a decoding process to the signal digitally demodulated by the demodulation part 201 to take out a transport stream, an extracting part 203 for extracting digital data multiplexed to the transport stream taken out by the decoding part 202 to perform an output corresponding to the contents of the digital data, an audio decoder 204, a video decoder 205 and a data decoder 206 to which the digital data extracted by the extracting part 203 is respectively inputted to respectively generate an audio signal, a video signal and a data signal, a memory 208 for holding the control information (PSI/SI information) included in the transport stream, a system controller 209 for controlling the respective parts of the receiver 200, an operation input part 211 to which the operation of a user is inputted and a display part 212 for displaying the data for the user.

The demodulation part 201 applies the digital demodulation process to the broadcast signal inputted from the receiving antenna 220.

The decoding part 202 decodes the signal by performing a deinterleave process or an error correction process relative to the signal digitally demodulated in the demodulation part 201 to take out the transport stream.

The extracting part 203 extracts each TS packet on the basis of a PID (packet identifying number) described in a TS packet in the transport stream inputted from the decoding part 202 to decide whether the digital data included in each TS packet belongs to the audio signal or to the video signal and output each digital data to the audio decoder 204 or the video decoder 205. Further, the extracting part 203 extracts the PSI/SI information such as NIT, SDT and BAT included in the transport stream and outputs each information included in the PSI/SI information to the system controller 209.

The audio decoder 204, the video decoder 205 and the data decoder 206 respectively apply the decoding processes to the digital data inputted from the extracting part 203 to generate the audio signal, the video signal and the data signal.

When an audio broadcasting only having audio information is simply received, the video decoder 205 and the data decoder 206 in the receiver 200 may not be provided.

The memory 208 may be composed of various kinds of rewritable semiconductor memories, and for instance, detachably attached to the receiver 200.

The system controller 209 transmits various kinds of signals to and receives signals from the parts of the receiver 200 to control the operations of the respective parts. The system controller 209 also extracts the information included in the PSI/SI information such as NIT, SDT and BAT inputted from the extracting part 203 to holds the information in the memory 208.

In the operation input part 211, various types of operations to the receiver such as a receiving start instruction, a service changing instruction and a setting of service numbers are performed by the user.

The display part 212 is composed of, for instance, a liquid crystal display device for displaying data such as service numbers, service names and additional information for the user.

Now, a data base constructed on the memory 208 will be described below.

On the memory 208, a terrestrial delivery system list, a service list and the connected transmission relation of transport streams are constructed as the data base.

The system controller 209 of the receiver 200 constructs the terrestrial delivery system list and the service list as shown in FIGS. 14 and 15 on the basis of the NIT and SDT (Service Description Table) inputted from the extracting part 203. In the NIT, a terrestrial delivery system descriptor and a service list descriptor are described. Thus, these descriptors are referred to so that the above-described terrestrial delivery system list and the service list can be constructed. In the terrestrial delivery system list and the service list, information concerning the transport streams transmitted in all service areas included in the PSI transmitted in the NIT is tabulated on the basis of "transport_stream_id" which is information for identifying each transport stream. However, in order to reduce the quantity of memory of the receiver, all information does not need to be necessarily constantly stored and held.

For instance, it can be understood that "frequency", "mode", "guard interval", and "area code" included in information required for receiving the transport stream in which the "transport_stream_id" is "TS1" respectively designates "xxxMHz", "10", "11" and "201010010011" by referring to the terrestrial delivery system list on the basis of the "transport_stream_id". Similarly, the reference to the service list makes it possible to respectively understand a "service ID" and or a "service type" required for specifying a service (program) included in the transport stream that the "transport_stream_id" is "TS1" as "service 2" and "audio broadcasting".

Accordingly, the receiver 200 refers to the terrestrial delivery system list and the service list so that the receiver can switch a reception from the service (program) which is being received to other service (program).

Further, the system controller 209 of the receiver 200 extracts the connected transmission descriptor [connected_transmission_descriptor( )] from the NIT in the currently received transport stream to constitute a connected transmission list obtained by listing a "TS-id" and a "connected transmission group ID" shown by each connected transmission descriptor and a "service ID" and a "network ID" as required.

The connected transmission list is constructed as mentioned above, hence other transport streams coordinated by the connected transmission descriptor can be recognized from the currently received transport stream. For example, when the transport stream having the connected transmission relation is switched to other transport stream, the transport stream can be rapidly switched with reference to the above-described list.

Further, when a reception is switched from the currently received service (program) to other service (program), the system controller 209 initially refers to the connected transmission list constructed on the memory 208. In this case, when a transport stream to which the currently received transport stream is switched is not shown on the connected transmission list, an ordinary receiving start process is carried out. On the contrary, when the transport stream to which the currently received transport stream is switched is shown on the connected transmission list, the channel is switched while a synchronizing operation upon demodulation is maintained.

Since the connected transmission descriptor is not always defined for all the transport streams, the connected transmission list may not be constructed for the transport stream which is not subject to the connected transmission process.

Further, since the connected transmission relation is different for each transport stream, the connected transmission list is updated when the transport stream is switched to other transport stream.

INDUSTRIAL APPLICABILITY

In a digital broadcasting system, a digital broadcasting transmitter, a digital broadcasting receiver and a digital broadcasting method according to the present invention, a signal obtained by modulating a transport stream specified in MPEG-2 Systems in accordance with an Orthogonal Frequency Division Multiplexing (OFDM) system can be employed as a broadcast signal. When a connected transmission that the OFDM signals to be transmitted to a plurality of transmission channels are multiplexed in the frequency direction while orthogonality is maintained is carried out, a connected transmission descriptor for coordinating a plurality of transport streams subject to a connected transmission process is included in control information prescribed in the MPEG-2 Systems and transmitted.

Thus, according to the present invention, a receiver side can know the transmission channels subject to the connected transmission process.

The invention claimed is:

1. A digital broadcasting transmitter for transmitting orthogonal frequency division multiplexing (OFDM) signals through a broadcasting network having a plurality of transmission channels, the OFDM signals being obtained by modulating a plurality of transport streams, the digital broadcasting transmitter comprising:

a transmitting device which transmits the OFDM signals in a connected transmission in the broadcasting network, wherein-an the OFDM signals comprising a plurality of OFDM segments including OFDM symbols generated in a time base direction for the plurality of transmission channels and multiplexed in a frequency direction, the plurality of OFDM segments multiplexed in the frequency direction and processed with a simultaneous Inverse Fast Fourier Transform (IFFT) to generate the OFDM signals; and the transmitting device further transmitting control information, the control information including information concerning a physical configuration of a transport stream supplied by the broadcasting network and the features of the broadcasting network, wherein the control information further includes a connected transmission descriptor for coordinating the plurality of transmission channels subject to the connected transmission, the connected transmission descriptor comprising:
information indicating whether a first data transport stream contained in an upper adjacent transmission channel op a higher frequency than a current transmission channel is present,
information indicating whether a second data transport stream contained in a lower adjacent transmission channel on a lower frequency than the current transmission channel is present, and
information indicating whether the first data transport stream contained in the upper adjacent transmission channel and the second data transport stream contained in the lower adjacent transmission channel are synchronously modulated or differentially modulated.

2. The digital broadcasting transmitter according to claim 1, wherein the connected transmission descriptor is included in an NIT (Network Information Table).

3. The digital broadcasting transmitter according to claim 1, wherein the connected transmission describes physical conditions of the connected transmission.

4. The digital broadcasting transmitter according to claim 1, wherein the plurality of transport streams and the control information are specified in MPEG-2 Systems.

5. The digital broadcasting transmitter according to claim 1 wherein the connected transmission descriptor indicates whether the OFDM symbols are transmitted in a connecte1 transmission a non-connected transmission.

6. A digital broadcasting receiver for receiving orthogonal frequency division multiplexing (OFDM) signals through a broadcasting network having a plurality of transmission channels, the OFDM signals being obtained by modulating transport streams, the digital broadcasting receiver comprising:

a receiving device which receives the OFDM signals in a connected transmission in the broadcasting network, the OFDM signals comprising a plurality of OFDM segments including OFDM symbols generated in a time base direction for the transmission channels and multiplexed in a frequency direction, the plurality of OFDM segments multiplexed in the frequency direction and processed with a simultaneous Inverse Fast Fourier Transform (IFFT) to generate the OFDM signals; and an extracting device which extracts control information the control information including information concerning a physical configuration of a transport stream supplied by the broadcasting network and the features of the broadcasting network, wherein the control information further includes a connected transmission descriptor for coordinating a current transmission channel and the plurality of transmission channels subject to the connected transmission, the connected transmission descriptor comprising:

information indicating whether a first data transport stream contained in an upper adjacent transmission channel on a higher frequency than the current transmission channel is present, and information indicating whether a second data transport stream contained in a lower adjacent transmission channel on a lower frequency than the current transmission channel is present, and information indicating whether the first data transport stream contained in the upper adjacent transmission channel and the second data transport stream contained in the lower adjacent transmission channel a e synchronously modulated or differentially modulated; and a controller which switches among the plurality o transmission channels based on the connected transmission descriptor.

7. The digital broadcasting receiver according to claim 6, wherein when the controller switches among the plurality of transmission channels the controller decides whether or not the connected transmission is established between a transmission channel before switching and the transmission channel after switching on the basis of the connected transmission descriptor, and when the connected transmission is established, the controller switches from one of the plurality of transmission channels to another transmission channel.

8. The digital broadcasting receiver according to claim 6, wherein when the received OFDM signals are synchronously modulated, an adjacent transmission channel is subject to the connected transmission, and when the adjacent transmission channel or an adjacent segment the synchronously modulated OFDM signals, the digital broadcasting receiver estimates transmission line characteristics using a pilot signal included in the OFDM signals of the adjacent transmission channel or the adjacent segment.

9. The digital broadcasting receiver according to claim 6, wherein the plurality of transport streams and the control information are specified in MPEG-2 Systems.

10. The digital broadcasting receiver according to claim 6, wherein the connected transmission descriptor indicates whether the OFDM symbols are transmitted in a connected transmission or a non-connected transmission.

11. The digital broadcasting receiver according to claim 6, wherein the control information further includes information concerning the physical conditions of the broadcast signal.

12. A digital broadcasting method for broadcasting orthogonal frequency division multiplexing (OFDM) signal through a broadcasting network having a plurality of transmission channels, the OFDM signals being obtained by modulating a plurality of transport streams, the digital broadcasting method comprising:

generating OFDM symbols in a time base direction for the plurality of transmission channels, the OFDM symbols being part f an OFDM segment;

multiplexing the OFDM symbols in a frequency direction;

processing a plurality of OFDM segments multiplexed in the frequency direction with a simultaneous inverse Fast Fourier Transform (IFFT) to generate the OFDM signals;

transmitting the OFDM signals in a connected transmission in the broadcasting network; and transmitting control information including information concerning a physical configuration of a transport stream supplied by the broadcasting network and the features of the broadcasting network, wherein the control information includes a connected transmission descriptor for coordinating the transmission channels subject to the connected transmission, the connected transmission descriptor comprising:

information indicating whether a first dat1 transport stream contained in an upper adjacent transmission channel on a higher frequency than a current transmission channel is present, information indicating whether a second data transport stream contained in a lower adjacent transmission channel on a lower frequency than the current transmission channel is present, and information indicating whether the first data transport stream contained in the upper adjacent transmission channel and the second data transport stream contained in the lower adjacent transmission channel are synchronously modulated or differentially modulated.

13. The digital broadcasting method according to claim 12, wherein the connected transmission descriptor is included in an NIT (Network Information Table).

14. The digital broadcasting method according to claim 12, wherein the connected transmission descriptor describes physical conditions of the connected transmission.

15. The digital broadcasting method according to claim 12, wherein the plurality of transport streams and the control information are specified in MPEG-2 Systems.

16. The digital broadcasting method according to claim 12, wherein the connected transmission descriptor indicates whether the OFDM symbols are transmitted in a connected transmission or a non-connected transmission.

17. A digital broadcasting method for receiving orthogonal frequency division multiplexing (OFDM) signals through a broadcasting network having a plurality of transmission channels, the OFDM signals being obtained by modulating a plurality of transport streams, the digital broadcasting method comprising:

receiving the OFDM signals in a connected transmission, wherein the OFDM signals comprising a plurality of OFDM segments including OFDM symbols generated in a time base direction for the plurality of transmission channels and multiplexed in a frequency direction, the plurality of OFDM segments multiplexed in the frequency direction and processed with a simultaneous Inverse Fast Fourier Transform (IFFT) to generate the OFDM signals;

decoding the OFDM signals to receive a transport stream;

extracting control information from the transport stream, the control information including information concerning a physical configuration of the transport stream supplied by the broadcasting network and the features of the broadcasting network; and switching among the plurality of transmission channels based on a connected transmission descriptor included in the control information which coordinates the plurality of transport streams subject to the connected transmission;

the connected transmission descriptor comprising:
information indicating whether a first data transport stream contained in an upper adjacent transmission channel on a higher frequency than a current transmission channel is present, information indicating whether a second data transport stream contained in a lower adjacent transmission channel on a lower frequency than the current transmission channel is present, and information indicating whether the first data transport stream contained in the upper adjacent transmission channel and the second data transport stream transmission contained in the lower adjacent channel are synchronously modulated or differentially modulated.

18. The digital broadcasting method according to claim 17, wherein the plurality of transport streams and the control information are specified in MPEG-2 Systems.

19. The digital broadcasting method according to claim 17, wherein the connected transmission descriptor indicates whether the OFDM symbols are transmitted in a connected transmission or a non-connected transmission.

20. The digital broadcasting method according to claim 17, wherein the control information further includes information concerning the physical conditions of the broadcast signal.

* * * * *

UNITED STATES PATENT AND TRADEMARK OFFICE
CERTIFICATE OF CORRECTION

PATENT NO.       : 7,697,411 B2
APPLICATION NO.  : 10/111527
DATED            : April 13, 2010
INVENTOR(S)      : Shinji Negishi et al.

It is certified that error appears in the above-identified patent and that said Letters Patent is hereby corrected as shown below:

On the Title Page, Item (74), in the *"Attorney, Agent, or Firm"*, line 2, "Garrent" should read --Garrett--.

*On the Title Page, Item (57), in the Abstract, line 3, "streams MPEG-2" should read --streams of MPEG-2--.

*On the Title Page, Item (57), in the Abstract, line 8, before "subject", delete "steams".

*In claim 1, column 14, line 22, before "the OFDM signals", delete "wherein-an".

*In claim 1, column 14, line 41, "op a higher" should read --on a higher--.

*In claim 3, column 14, line 57, "transmission describes" should read --transmission descriptor describes--.

*In claim 5, column 14, lines 62-63, "claim 1 wherein" should read --claim 1, wherein--.

*In claim 5, column 14, line 64, "connecte1" should read --connected--.

*In claim 5, column 14, line 65, "transmission a non-connected" should read --transmission or a non-connected--.

*In claim 6, column 15, line 14, "information the" should read --information, the--.

*In claim 6, column 15, line 28, after "is present,", delete "and".

*In claim 6, column 15, line 36, "channel a e" should read --channel are--.

Signed and Sealed this

Seventeenth Day of August, 2010

David J. Kappos
*Director of the United States Patent and Trademark Office*

CERTIFICATE OF CORRECTION (continued)
U.S. Pat. No. 7,697,411 B2

*In claim 6, column 15, line 39, "plurality o" should read --plurality of--.

*In claim 7, column 15, line 44, "channels the controller" should read --channels, the controller--.

*In claim 8, column 15, line 55, "segment the synchronously" should read --segment transmits the synchronously--.

*In claim 12, column 16, line 5, "(OFDM) signal" should read --(OFDM) signals--.

*In claim 12, column 16, line 12, "part f an" should read --part of an--.

*In claim 12, column 16, line 15, "inverse" should read --Inverse--.

*In claim 12, column 16, line 28, "dat1" should read --data--.

*In claim 17, column 16, line 63, before "the OFDM signals", delete "wherein".

*In claim 17, column 17, lines 13-14, "transmission;" should read --transmission,--.

*In claim 17, column 18, lines 5-6, after "data transport stream", delete "transmission".

*In claim 17, column 18, line 6, "adjacent channel" should read --adjacent transmission channel--.